(12) United States Patent
Piaton

(10) Patent No.: US 8,937,473 B2
(45) Date of Patent: Jan. 20, 2015

(54) ANGULAR POSITION SENSOR AND ASSEMBLY COMPRISING A ROTARY SYSTEM AND SUCH A SENSOR

(75) Inventor: Jérôme Piaton, Paris (FR)

(73) Assignee: Sagem Defense Securite, Paris (FR)

( * ) Notice: Subject to any disclaimer, the term of this patent is extended or adjusted under 35 U.S.C. 154(b) by 256 days.

(21) Appl. No.: 13/504,124

(22) PCT Filed: Nov. 5, 2010

(86) PCT No.: PCT/EP2010/066942
§ 371 (c)(1),
(2), (4) Date: Apr. 25, 2012

(87) PCT Pub. No.: WO2011/054940
PCT Pub. Date: May 12, 2011

(65) Prior Publication Data
US 2012/0217957 A1 Aug. 30, 2012

(30) Foreign Application Priority Data

Nov. 9, 2009 (FR) ...................................... 09 57908

(51) Int. Cl.
*G01B 7/30* (2006.01)
*G01D 5/14* (2006.01)
*G01D 5/245* (2006.01)

(52) U.S. Cl.
CPC .............. *G01D 5/145* (2013.01); *G01D 5/2451* (2013.01)
USPC .............. 324/207.25; 324/207.22; 324/207.2; 324/207.24; 310/68 B; 310/186

(58) Field of Classification Search
CPC .............. G01B 7/30; G01B 7/14; G01D 5/14; G01D 5/12; G01D 5/145; G01D 5/2451; H02K 29/06; H02K 29/12
USPC ................ 324/207.22, 207.2, 207.24, 207.25
See application file for complete search history.

(56) References Cited

U.S. PATENT DOCUMENTS 5,909,072 A * 6/1999 Muller ........................ 310/68 B
6,433,536 B1 8/2002 Yundt et al.
6,683,397 B2 * 1/2004 Gauthier et al. ............ 310/68 B (Continued)

FOREIGN PATENT DOCUMENTS

CN 1712901 A 12/2005
CN 101076733 A 11/2007

(Continued)

*Primary Examiner* — Tung X Nguyen
*Assistant Examiner* — Son Le
(74) *Attorney, Agent, or Firm* — Blakely Sokoloff Taylor & Zafman

(57) ABSTRACT

Sensor for continuously measuring the angular position of a shaft rotatably mounted relative to a housing. The sensor includes a stator, a rotor attachable to the shaft, and permanent magnets having alternating polarities located on a stator or a rotor capable of creating magnetic induction during the rotation of the rotor. A magnetic circuit channels the magnetic induction such that it is proportional to a sinusoidal function of the angle of the rotor. At least two electric transducers having linear output, each angularly offset one from the other relative to the stator, are located in the gaps arranged in the circuit. The magnetic circuit is toothed and includes at least one measuring unit having three teeth per pair of magnets, each tooth including a gap with a transducer.

12 Claims, 2 Drawing Sheets

(56) References Cited

U.S. PATENT DOCUMENTS

2005/0285592 A1 12/2005 Taniguchi et al.
2008/0309266 A1 12/2008 Chemin et al.

FOREIGN PATENT DOCUMENTS

| DE | 41 41 000 A1 | 6/1992 |
|----|--------------|--------|
| FR | 2 155 303 | 4/1973 |

* cited by examiner

ANGULAR POSITION SENSOR AND ASSEMBLY COMPRISING A ROTARY SYSTEM AND SUCH A SENSOR

This is a non-provisional application claiming the benefit of International Application Number PCT/EP2010/066942 filed Nov. 5, 2010.

GENERAL TECHNICAL FIELD

The present invention relates to a sensor intended to be placed on a system comprising a shaft rotatably mounted relative to a housing and for which it is wished to measure continuously an angular position.

The invention also relates to an assembly comprising on the one hand an aforementioned system and a sensor according to the invention.

PRIOR ART

Numerous electric motors are known, for which it is desired to be able to carry out a vector drive. Yet, to carry out the vector drive of the motor, it is necessary to be able to measure the position of the axis of the rotor of the motor relative to the stator.

Current solutions for measuring the position of the axis of the rotor relative to the stator use Hall probes, detecting the magnetic induction B created by the magnets of the rotor.

For simple commands of the motor, for example a command of the trapeze type, three Hall probes having discrete output are sufficient: the north and south poles of the magnets are in fact detected. Said Hall probes having discrete output do not require any particular magnetic circuit.

But this principle does not enable either a speed drive of the motor or a vector drive.

DESCRIPTION OF THE INVENTION

The invention proposes making up for at least one of these drawbacks.

To this end, according to the invention a sensor according to claim 1 is proposed.

The invention is advantageously completed by the characteristics of claims 2 to 5, taken alone or in any technically possible combination thereof.

The invention also relates to an assembly according to claim 6, in other words comprising on the one hand an aforementioned system and a sensor according to the invention.

The invention is advantageously completed by the characteristics of claims 7 to 9, taken alone or in any technically possible combination thereof.

The invention has numerous advantages.

The invention enables a measurement of the position of the axis of the shaft in rotation relative to the housing, using linear electric transducers, for example Hall probes.

In so far as, due to the magnetic circuit, the magnetic induction is of sinusoidal form, the measurement of the sensor is precise enough to enable a vector drive of a motor.

For the driving of a multipolar motor, it is possible to install a sensor having the same number of poles as the motor.

The measurement is reliable and compatible with the operational life of an electric motor (of the order of 150,000 hours).

The sensor advantageously has a disc shape installed in the continuation of the stator, and has a low steric hindrance.

DESCRIPTION OF THE FIGURES

Other characteristics, aims and advantages of the invention will become clearer from the description that follows, which is purely illustrative and non limiting, and which should be read with reference to the appended drawings, in which.

In all of the figures, similar elements bear identical numerical references.

DETAILED DESCRIPTION

Figure 1:
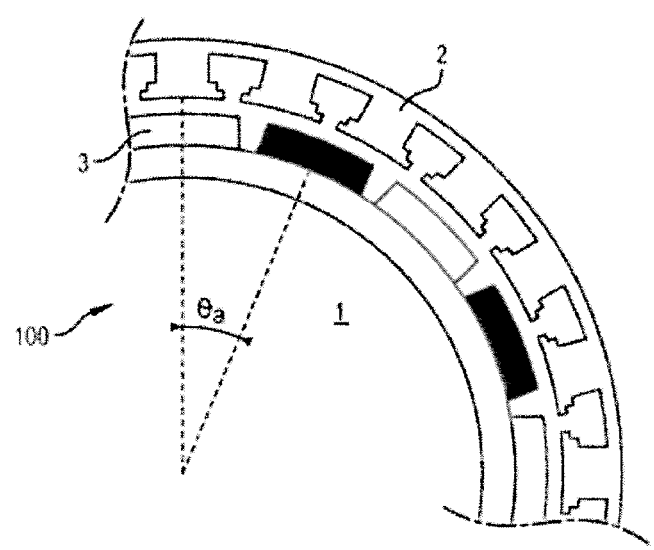
FIG. 1 shows schematically a possible embodiment of a known system comprising a shaft rotatably mounted relative to a housing, and for which it is wished to measure continuously an angular position.
Figure 2:
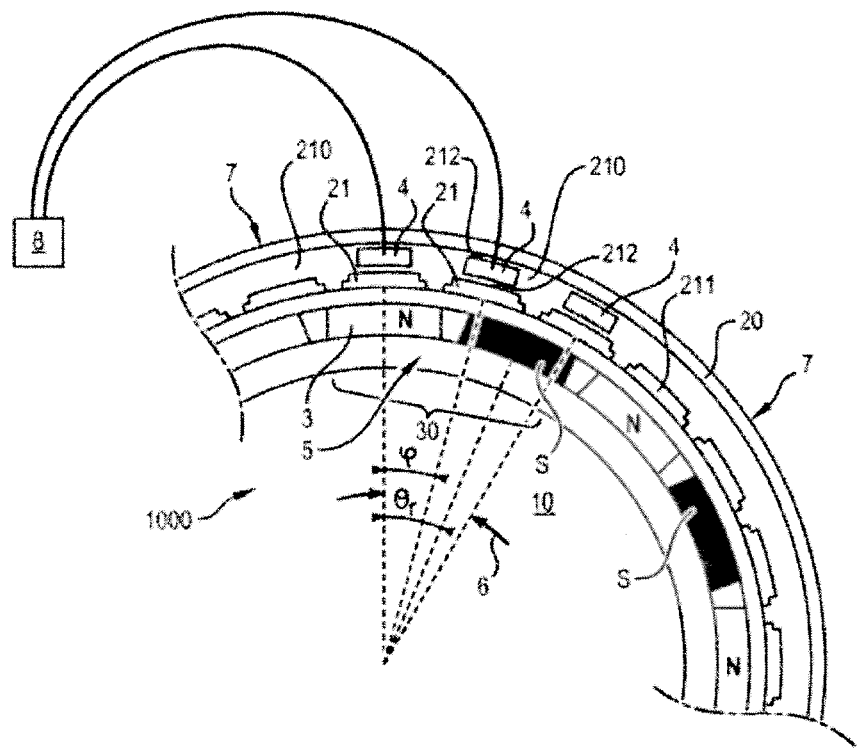
FIG. 2 shows schematically in radial section a possible embodiment of a sensor according to the invention.

FIG. 2 shows schematically a possible embodiment of a sensor 1000 intended to be placed on a system 100, known and visible in FIG. 1.

As shown in FIG. 1, the system 100 comprises a shaft 1 rotatably mounted relative to a housing 2 and for which it is wished to measure continuously an angular position θa.

The sensor 1000 principally comprises a stator 20 and a rotor 10 for a connection to the shaft 1.

Figure 3:
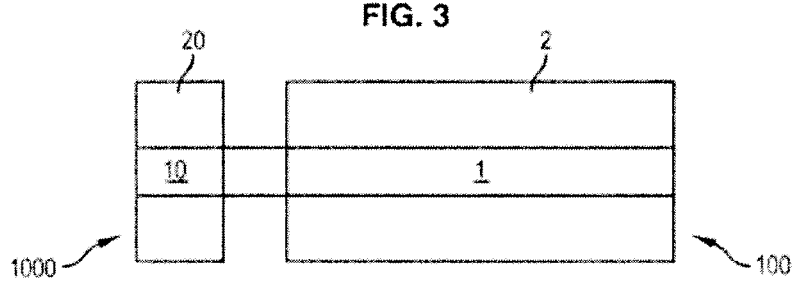
FIG. 3 shows schematically a longitudinal section of a possible embodiment of an assembly comprising a system and a sensor according to the invention.

As shown in FIG. 3, the connection between the rotor 10 and the shaft 1 is such that an angular position θr of the rotor 10 relative to the stator 20 is the same as the angular position θa of the shaft 1 relative to the housing 2.

Advantageously, the shaft 1 and the rotor 10 are one piece, but the rotor 10 can also be transferred onto the shaft 1 by any means of fixation, such as for example through a mechanical cooperation of parts, by welding or by bonding.

In FIG. 3, the shaft 1 in rotation is central relative to the system 100. It will be understood however that any other configuration is also possible, such as for example the shaft in rotation may be peripheral to the system. In all cases, the rotor linked to the shaft may be central or peripheral to the sensor.

The sensor 1000 also comprises at least one pair of permanent magnets 3 of north polarities, conventionally referenced by N in the figures, and south, conventionally referenced by S in the figures, the polarities being alternated in each pair 30.

In FIG. 2, the pairs 30 of magnets 3 are located on the rotor 10, but it will be understood that the pairs 30 of magnets 3 can also be located on the stator 20.

In all cases, during the rotation of the rotor 10, each pair 30 creates a magnetic induction B in the sensor 1000.

The sensor 1000 conventionally also comprises a magnetic circuit 21 for channelling said magnetic induction B created by each pair 30 of magnets 3.

As may be observed in FIG. 2, the circuit 21 comprises at least two gaps 210, the function of which is explained in more detail in the remainder of the present description.

By design and construction, the circuit 21 is adapted so that the magnetic induction B is proportional to a sinusoidal function of the angular position θr of the rotor 10.

With the adapted design of the circuit 21, one has the relation:

$$B = k \cdot \sin(\theta r) \qquad (EQ1)$$

where k is a constant of the circuit 21.

The sensor 1000 comprises in addition at least two electric transducers 4 having linear output, angularly offset to each other by an angle φ relative to the stator 20, and each placed in a gap 210 as shown in FIG. 2.

The transducers 4 are advantageously Hall probes, but can also be magnetoresistances or flux gates.

In all cases, the transducers 4 each deliver at their output a signal U which is a function of the magnetic induction B. On account of their linearity, one has the relation, in combination with (EQ1):

$$U = K \cdot B = K \cdot k \cdot \sin(\theta r) \quad \text{(EQ2)}$$

where K is the linearity constant of the transducer 4.

The signals at the output of the transducers are delivered to processing means 8 conventionally comprising all of the necessary calculation and memory means.

Thanks to the at least two offset transducers 4, the angular position Or of the rotor 10 relative to the stator 20 may be determined: the two sinusoidal signals at the output of the transducers 4 have a phase difference corresponding to the angular offset $\phi$.

The Hall probes, preferential, are of low steric hindrance. As shown in FIG. 3, the sensor advantageously has a disc shape installed in the continuation of the stator, and a low steric hindrance.

Advantageously, the sensor 1000 comprises three transducers 4, in the form of three phase structure, which deliver a three phase grid of signals at their output. The three phase structure is robust, considering that two transducers 4 suffice to define the angular position $\theta r$, the third transducer 4 makes it possible to improve the precision and to detect any breakdowns.

In order to design the circuit 21 to obtain the relation (EQ1), the magnetic circuit 21 is advantageously of the toothed type, according to the designation of those skilled in the art. The types of magnetic circuit 21 giving the relation (EQ1) are known to those skilled in the art.

To this end, the circuit 21 comprises at least one measuring unit 5 comprising three teeth 211 per pair 30 of magnets 3, each tooth 211 of the unit comprising a gap 210 taking a transducer 4. Any multiple of this configuration is also possible.

Other configurations are also possible for the measuring unit. Each measuring unit may thus comprise for example:
nine teeth for four pairs of magnets; or
nine teeth for five pairs of magnets; or
twelve teeth for five pairs of magnets.

As previously, any multiple of each of these configurations is also possible.

It is possible to arrange transducers 4 over the whole periphery of the sensor 1000, in other words to have a measuring unit 5 that makes an angle of 360°.

However, it is also possible to provide a measuring unit 5 on an angular section 6 only of the sensor 1000. One thus saves on transducers 4.

However, in this case, the magnetic circuit 21 advantageously comprises a toothed structure 7 having gaps 210 not taking a transducer 4, on either side of the section 6 defining the measuring unit 5, in order to maintain substantially the same geometry on either side of the transducers 4, and to obtain at the output of all of the transducers 4 identical signals.

Advantageously, each gap 210 of the measuring unit 5 comprises a plurality of transducers 4, in order to ensure a redundancy of information.

Preferentially, the faces 212 of each gap 210 are parallel. In this case, the magnetic induction B is quasi uniform, which makes it possible to become free of errors of position of the transducer 4 in the gap 210.

The sensor 1000 of the invention applies to any assembly comprising a system 100 comprising a shaft 1 rotatably mounted relative to a housing 2, but applies advantageously to a magnet synchronous electric motor. The invention enables a continuous measurement of the angular position $\theta a$ of the motor (due to the connection between the rotor 10 and the shaft 1), and thereby enables a vector drive of the electric motor.

In the case where the motor is a multipolar motor, the sensor 1000 comprises as many pairs 30 of permanent magnets 3 of alternating N and S polarities as poles of the motor 100.

In so far as all the transducers are subjected to the influence of the same magnets, a variation of assembly of the level of induction B does not perturb the estimation of the position, whether in two phase mode, three phases or more.

The invention claimed is:

1. Sensor adapted to be placed on a system comprising a shaft rotatably mounted relative to a housing for measuring continuously an angular position of said shaft relative to the housing, said sensor comprising:
a stator;
a rotor for a connection to the shaft, such that an angular position of the rotor relative to the stator is the same as the angular position of the shaft relative to the housing;
at least one pair of permanent magnets of alternating polarities, located on one or the other of the stator and the rotor, and capable of creating a magnetic induction during the rotation of the rotor;
a magnetic circuit for channelling said magnetic induction created by said pair of magnets, said circuit being adapted such that the magnetic induction is proportional to a sinusoidal function of the angular position of the rotor,
wherein the magnetic circuit is toothed, and comprises at least one measuring unit comprising three teeth per pair of magnets, said measuring unit comprising at least two gaps each adapted to take at least one transducer;
at least two electric transducers having linear output, angularly offset to each other relative to the stator and each placed in a gap of said measuring unit, so that each of the at least two electric transducers deliver at their output a sinusoidal signal which is a function of the magnetic induction in the magnetic circuit, said sinusoidal signals at the output of the transducers having a phase difference corresponding to the angular offset;
wherein each tooth of the measuring unit comprises a gap taking a transducer.

2. Sensor according to claim 1, comprising at least one measuring unit on an angular section only of the sensor.

3. Sensor according to claim 2, in which the magnetic circuit advantageously comprises a toothed structure having gaps not taking a transducer, on either side of the section.

4. Sensor according to claim 1, in which each gap of the measuring unit comprises a plurality of transducers.

5. Sensor according to claim 1, in which the faces of the gap are parallel.

6. Assembly comprising a system comprising a shaft rotatably mounted relative to a housing, wherein said assembly comprises a sensor placed on the system, said sensor comprising:
a stator;
a rotor connected to the shaft, such that an angular position of the rotor relative to the stator is the same as the angular position of the shaft relative to the housing;
at least one pair of permanent magnets of alternating polarities, located on one or the other of the stator and the rotor, and capable of creating a magnetic induction during the rotation of the rotor;
a magnetic circuit for channelling said magnetic induction created by said pair of magnets, said circuit being adapted such that the magnetic induction is proportional to a sinusoidal function of the angular position of the rotor, wherein the magnetic circuit is toothed, and comprises at least one measuring unit comprising three teeth per pair of magnets, said measuring unit comprising at least two gaps each adapted to take at least one transducer;

at least two electric transducers having linear output, angularly offset to each other relative to the stator and each placed in a gap of said measuring unit, so that each of the at least two electric transducers deliver at their output a sinusoidal signal which is a function of the magnetic induction in the magnetic circuit, said sinusoidal signals at the output of the transducers having a phase difference corresponding to the angular offset;

wherein each tooth of the measuring unit comprises a gap taking a transducer.

7. Assembly according to claim 6, in which the shaft and the rotor are one piece.

8. Assembly according to claim 6, in which the system is a magnet synchronous electric motor.

9. Assembly according to claim 8, in which the motor is a multipolar motor, the sensor comprising as many pairs of permanent magnets of alternating polarities as poles of the motor.

10. Assembly according to claim 6, wherein the rotor of the sensor is affixed on the shaft of the system.

11. Assembly according to claim 6, wherein the stator of the sensor is separate from the housing of the system.

12. A method for measuring continuously an angular position of a shaft relative to a housing, said shaft being rotatably mounted relative to said housing, wherein the angular position is measured with a sensor comprising:
a stator;
a rotor connected to the shaft, such that an angular position of the rotor relative to the stator is the same as the angular position of the shaft relative to the housing;
at least one pair of permanent magnets of alternating polarities, located on one or the other of the stator and the rotor, and capable of creating a magnetic induction during the rotation of the rotor;
a magnetic circuit for channelling said magnetic induction created by said pair of magnets, said circuit being adapted such that the magnetic induction is proportional to a sinusoidal function of the angular position of the rotor, wherein the magnetic circuit is toothed, and comprises at least one measuring unit comprising three teeth per pair of magnets, said measuring unit comprising at least two gaps each adapted to take at least one transducer;
at least two electric transducers having linear output, angularly offset to each other relative to the stator and each placed in a gap of said measuring unit;
in which method:
each of the at least two electric transducers deliver at their output a sinusoidal signal which is a function of the magnetic induction in the magnetic circuit, said sinusoidal signals at the output of the transducers having a phase difference corresponding to the angular offset,
the angular position of the rotor relative to the stator is determined from said sinusoidal signals.

\* \* \* \* \*